US011893096B2

(12) United States Patent
Grajek et al.

(10) Patent No.: US 11,893,096 B2
(45) Date of Patent: *Feb. 6, 2024

(54) COMPUTER USER AUTHENTICATION USING MACHINE LEARNING

(71) Applicant: Cylance Inc., San Ramon, CA (US)

(72) Inventors: Garret Florian Grajek, Aliso Viejo, CA (US); Jeffrey Lo, Irvine, CA (US); Michael Thomas Wojnowicz, Irvine, CA (US); Dinh Huu Nguyen, Santa Ana, CA (US); Michael Alan Slawinski, Laguna Hills, CA (US)

(73) Assignee: Cylance Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,110

(22) Filed: Dec. 2, 2021

(65) Prior Publication Data

US 2022/0092159 A1 Mar. 24, 2022

Related U.S. Application Data

(63) Continuation of application No. 15/696,057, filed on Sep. 5, 2017, now Pat. No. 11,301,550.

(Continued)

(51) Int. Cl.
*G06F 21/31* (2013.01)
*G06N 20/00* (2019.01)
(Continued)

(52) U.S. Cl.
CPC ............ *G06F 21/316* (2013.01); *G06N 7/00* (2013.01); *G06N 20/00* (2019.01);
(Continued)

(58) Field of Classification Search
CPC . G06F 21/316; G06F 2221/2139; G06N 7/00; G06N 20/00; H04L 63/0861;
(Continued)

(56) References Cited

U.S. PATENT DOCUMENTS

| 8,234,494 B1 | 7/2012 | Bansal et al. |
| 8,769,427 B2 | 7/2014 | Raman et al. |

(Continued)

FOREIGN PATENT DOCUMENTS

WO   WO 2016019093 A1   2/2016

OTHER PUBLICATIONS

Mario Frank, et al., Touchalytics On the Applicability of Touchscreen Input as a Behavioral Biometric for Continuous Authentication, Jan. 2013, IEEE Transactions on Information Forensics and Security (vol. 8, Issue: 1, Jan. 2013), hereinafter Frank).

(Continued)

*Primary Examiner* — Henry Tsang
(74) *Attorney, Agent, or Firm* — Jones Day

(57) ABSTRACT

Systems and methods are described herein for computer user authentication using machine learning. Authentication for a user is initiated based on an identification confidence score of the user. The identification confidence score is based on one or more characteristics of the user. Using a machine learning model for the user, user activity of the user is monitored for anomalous activity to generate first data. Based on the monitoring, differences between the first data and historical utilization data for the user determine whether the user's utilization of the one or more resources is anomalous. When the user's utilization of the one or more resource is anomalous, the user's access to the one or more resource is removed.

28 Claims, 5 Drawing Sheets

Related U.S. Application Data

(60) Provisional application No. 62/384,623, filed on Sep. 7, 2016.

(51) Int. Cl.
*H04W 12/062* (2021.01)
*H04W 12/065* (2021.01)
*H04W 12/06* (2021.01)
*G06N 7/00* (2023.01)
*H04L 9/40* (2022.01)

(52) U.S. Cl.
CPC ...... *H04L 63/0861* (2013.01); *H04L 63/1425* (2013.01); *H04W 12/062* (2021.01); *H04W 12/065* (2021.01); *H04W 12/068* (2021.01); *G06F 2221/2139* (2013.01); *H04L 63/102* (2013.01)

(58) Field of Classification Search
CPC ............. H04L 63/1425; H04L 63/102; H04W 12/062; H04W 12/065; H04W 12/068
See application file for complete search history.

(56) References Cited

U.S. PATENT DOCUMENTS

| | | | |
|---|---|---|---|
| 8,914,862 B2 | 12/2014 | Rodriguez et al. | |
| 9,275,345 B1 | 3/2016 | Song et al. | |
| 9,294,498 B1 | 3/2016 | Yampolskiy et al. | |
| 9,485,237 B1* | 11/2016 | Johansson | H04L 9/3271 |
| 9,537,880 B1* | 1/2017 | Jones | H04L 63/1433 |
| 9,686,300 B1* | 6/2017 | Kurupati | H04L 63/1425 |
| 9,801,066 B1 | 10/2017 | Hanley et al. | |
| 10,108,791 B1 | 10/2018 | Masterman et al. | |
| 10,237,298 B1* | 3/2019 | Nguyen | H04L 63/1408 |
| 2006/0020792 A1 | 1/2006 | Weiss | |
| 2006/0224898 A1 | 10/2006 | Ahmed | |
| 2007/0248084 A1 | 10/2007 | Whitehead | |
| 2008/0072301 A1* | 3/2008 | Chia | H04L 63/0815 726/8 |
| 2010/0122333 A1 | 5/2010 | Noe | |
| 2010/0125585 A1 | 5/2010 | Chu et al. | |
| 2012/0054845 A1 | 3/2012 | Rodriguez et al. | |
| 2012/0233665 A1 | 9/2012 | Ranganathan | |
| 2015/0089568 A1* | 3/2015 | Sprague | H04L 63/0853 726/1 |
| 2015/0180868 A1* | 6/2015 | Sng | H04L 63/0846 726/9 |
| 2015/0319185 A1 | 11/2015 | Kirti et al. | |
| 2015/0373007 A1 | 12/2015 | Sheller et al. | |
| 2016/0057146 A1 | 2/2016 | Little et al. | |
| 2016/0057623 A1 | 2/2016 | Dutt et al. | |
| 2016/0162683 A1* | 6/2016 | Gibson | G06F 21/32 726/17 |
| 2016/0212115 A1 | 7/2016 | Hamlin et al. | |
| 2017/0093902 A1 | 3/2017 | Roundy et al. | |
| 2017/0244689 A1 | 8/2017 | Cetlur et al. | |
| 2017/0279957 A1 | 9/2017 | Abramson | |
| 2017/0289168 A1 | 10/2017 | Bar et al. | |
| 2019/0245851 A1 | 8/2019 | Whaley et al. | |
| 2020/0244639 A1 | 7/2020 | Khan et al. | |

OTHER PUBLICATIONS

Prateek Joshi, How To Compute Confidence Measure For SVM Classifiers, https://prateekvjoshi.com/2015/12/15/how-to-compute-confidence-measure-for-svm-classifiers/, Dec. 15, 2015, hereinafter Joshi).

Chhotu Kumar et al., Bank note authentication using decision tree rules and machine learning techniques, Mar. 19-20, 2015, 2015 International Conference on Advances in Computer Engineering and Applications (ICACEA) IMS Engineering College, Ghaziabad, India, pp. 310-314.

European Patent Office, European Patent Application No. 17769154.0, Communication pursuant to Article 94(3) EPC, dated Dec. 2, 2020 (4 pages).

Frank et al., "Touchalytics: On the Applicability of Touchscreen Input as a Behavioral Biometric for Continuous Authentication," IEEE Transactions on Information Forensics and Security, vol. 8, No. 1:136-148 (2012).

Patent Cooperation Treaty, International Preliminary Report on Patentability for Application No. PCT/US2017/050205, dated Mar. 21, 2019.

Patent Cooperation Treaty, International Search Report and Written Opinion for Application No. PCT/US2017/050205, dated Oct. 23, 2017.

Ramazan Gokberk Cinbis, et al., Unsupervised Metric Learning for Face Identification in TV Video, Nov. 2011, Proceedings / IEEE International Conference on Computer Vision. IEEE International Conference on Computer Vision, pp. 1-10.

Rohan V. Ponkshe, et al., Authentication Enhancement Based On Mouse and Keystroke Features, https:// www.ijcsmc.com/docs/papers/June2015N4I6201599a43.pdf, Jun. 2015, pp. 1-9.

* cited by examiner

COMPUTER USER AUTHENTICATION USING MACHINE LEARNING

CROSS-REFERENCE TO RELATED APPLICATIONS

The present application is a continuation of U.S. patent application Ser. No. 15/696,057 filed on Sep. 5, 2017 which, in turn, claims priority to U.S. Pat. App. Ser. No. 62/384,623, filed Sep. 7, 2016, the contents of both of which are hereby incorporated by reference.

TECHNICAL FIELD

The subject matter described herein relates generally to authentication and more specifically to utilizing machine learning and/or artificial intelligence for automated logon and logoff of a user, and suspension or termination of processes for an information technology resource.

BACKGROUND

In order to access an information technology (IT) resource (e.g., software application(s), data, and/or the like), users are often required to authenticate themselves to the system providing the IT resource. For example, if a user wishes to access their personal checking account through an online banking application, the user may be required to enter a username, a password, etc. and/or to provide an additional authentication code (e.g., a temporary code which the bank provides to a known device associated with the user). Although these authentication measures generally increase security and reduce the potential that a user's personal information may be compromised, work-a-rounds to these measures are often discovered and exploited. Furthermore, requiring a user to continuously authenticate access to a provider during use by taking the time to enter usernames and passwords, and/or verifying oneself each time a user desires to access an IT resource can cause "friction" between the user and the provider of the resource, which can decrease the likelihood that a user continues to utilize the provider. As such, systems and methods of providing stronger authentication and/or decreasing effort required of the user can be desirable.

SUMMARY

In one aspect, authentication for a user is initiated based on an identification confidence score of the user. The identification confidence score is based on one or more characteristics of the user. The authentication can include requesting the user's biometrics. The one or more characteristics can be at least one of: a device in use by the user, a geographical location of the device, an authentication history of the user, a manner in which the user uses the device, or a reputation of the internet protocol address used by the device. Using a machine learning model for the user, user activity of the user is monitored for anomalous activity to generate first data. The anomalous activity can include, for example, one or more observed user behavior that is not consistent with previously observed actions of the user. Based on the monitoring, differences between the first data and historical utilization data for the user determine whether the user's utilization of the one or more resources is anomalous. When the user's utilization of the one or more resource is anomalous, the user's access to the one or more resource is removed. In some variations, after the removing, the identification confidence score can be modified based on the one or more characteristics of the user.

In response to anomalous activity by the user, all processes associated with the user can be suspended. In other variations, in response to anomalous activity by the user, all processes associated with the user can be terminated.

In some variations, the manner in which the user uses the device can include one or more of: the user's speed of typing, intervals between the user typing characters, a firmness of the user pressing a user interface, or a location of the user's input on the user interface.

The user's utilization of the one or more resources can be monitored to generate snapshot data. In some variations, the snapshot data can be compared against historical utilization data for the user to determine whether the user's utilization of the one or more resources is anomalous. In other variations, the snapshot data can be compared against known actions of an attacker to determine whether the user's utilization of the one or more resources is anomalous. In yet another variation, the snapshot data can be compared against historical utilization data for a group of users similar to the user to determine whether the user's utilization of the one or more resources is anomalous.

In other variations, an identity token for the user related to the authentication of the user can be provided to the one or more resources. The one or more resources can include software applications, application proxies, network services, mobile device managers, desktop access, or server access. Removing the user's access to the one or more resource can include informing the one or more resources of the anomalous activity based on the identity token.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for continuous user authentication based on multi-modal utilization of biometric behavior and user conduct collected from an authenticated user. Machine learning models are generated to analyze biometric behavior and user conduct. Such machine learning models provide an identity confidence score to inform whether a user's session should be maintained or terminated.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference symbols in the various drawings indicate like elements.

DETAILED DESCRIPTION

As noted above, users are often required to authenticate themselves before accessing IT resources. Although many authentication measures increase security and reduce the potential that a user's personal information may be compromised, work-a-rounds to these measures are often discovered and exploited, and authentication procedures often cause friction between users and providers of IT resources. Therefore, systems and methods of providing stronger continuous authentication and/or decreasing effort on the end of the user are provided.

Systems and methods described herein can, in some implementations, provide for continuous authentication through continuous monitoring and analysis of user behaviors and conduct. These systems and methods can also utilize artificial intelligence (AI) before, during, and/or after a user logs on to access an IT resource (also referred to herein as an IT logon). The systems and methods described can utilize multiple factors and intelligence to analyze information that may be extracted from an IT resource provider (e.g., an enterprise) and/or a user's context before the user is allowed to access the IT resource(s). Additionally or alternatively, data regarding the user's conduct after the user logs onto the resource may be collected. User conduct data can be evaluated, and based on the evaluations, the user may be log-offed and asked to re-authenticate themselves. In some aspects, the continuous authentication can be similar to, stronger than, and/or the same as the prior authentication method that the user performed to obtain access to the IT resource(s). If evaluations of the user conduct data do not indicate that the user is doing something improper and/or inconsistent with the user's normal use patterns, then the user may be allowed to continue accessing the IT resource(s).

Figure 1:
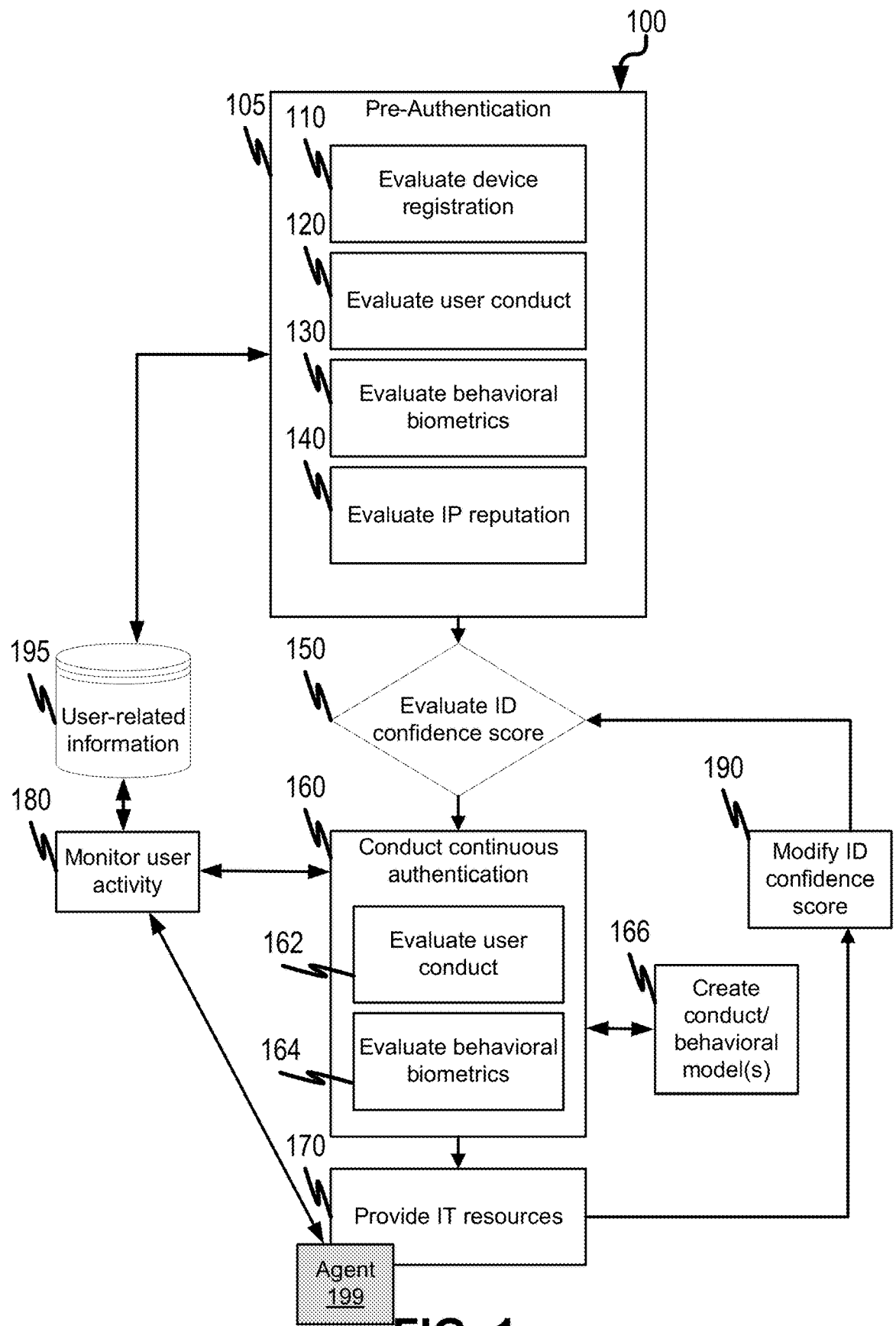
FIG. 1 illustrates a functional block diagram of an example of a system for authenticating a user.

FIG. 1 illustrates a functional block diagram of an example of a system 100 for authenticating a user. Although specific operations are described as occurring in a specific order and functions are described as being implemented through a specific device, in various aspects, not all operations may be present, additional and/or alternative operations may be present, and/or different devices may be used to implement the various operations. For example, as illustrated and described, the system 100 can utilize pre-authentication operations as well as post-authentication (e.g., continuous authentication) operations. However, in some aspects, only pre-authentication can be utilized, only post-authentication can be utilized, and/or only a subset of each of the pre-authentication and post-authentication operations can be utilized together.

The system 100 can be utilized when a user requests access to and/or initiates a procedure to obtain access to an IT resource. For example, the system 100 can provide a logon user interface for a user. As part of a logon phase, the system 100 can allow for multiple user validation mechanisms. One purpose of these mechanisms can be to help the system 100 determine an "identity (ID) confidence" score for the user before one or more authentication method is applied. In some aspects, identity confidence can generally refer to a numerical and/or statistical value indicative of how much the system 100 trusts that the user is who they purport to be. For example, an ID confidence score for a user can be on a scale of "0" to "100" where a value of "100" indicates that the system has 100% confident that the user attempting to log on is who they purport to be. In such an instance, the ID confidence score of the user can be "self-authenticating," meaning that the user does not need to authenticate themselves (e.g., the user does not need to enter a password). As another example, the system 100 can determine that a user's ID confidence score is "50" and therefore determine that the user needs to authenticate themselves (e.g., enter a password). Similarly, if the system 100 determines that the user's ID confidence score is "0" then the system 100 can require multi-factor authentication (e.g., enter a password and enter an authentication token provided to a known device).

Although specific examples of the use of the ID confidence score are provided, these examples are mostly for illustration and are not intended to be limiting. Additional details on the use of the ID confidence score are provided below.

Upon receiving an IT resource request, the system 100 can conduct a pre-authentication procedure 105 for the user. In some aspects, the pre-authentication procedure 105 can be used to generate the ID confidence score for a user. As illustrated, the pre-authentication procedure 105 can include device registration evaluation 110. Device registration can refer to recognizing a particular device and associating the device with a user. The process of device registration can involve using one or more authentication methods (e.g., SMS, telephony, push, biometric, and/or the like) to validate the identity of the user using the device. These methods can be used when a user sets up a new account and/or uses a new device to access the system 100 for the first time. Once the user's identity is validated, a device identifier can be pushed and/or pulled from the device. For example, a pulled identifier can be a serial ID from an Android phone and/or the like, and a pushed identifier can be an X.509 certificate and/or the like generated by the system 100 and pushed down to the device. The system 100 can map the pushed and/or pulled identifier from the device to cloud service for future authentications, verifications, and/or device registration evaluation 110 of the user and/or the device utilized. In some aspects, a user/device tuple and/or other related information can be stored as user-related information 195. For example, the user-related information 195 can be included in a database that is on premise and/or in the cloud.

As illustrated, the pre-authentication procedure 105 can additionally or alternatively include user conduct evaluation 120. In some aspects, user conduct can refer to circumstances surrounding a user's logon, such as web browser configuration, language, installed fonts, browser plug-ins, device IP address, screen resolution, browser cookie settings, geographical location, time zone, geo-velocity (e.g., geographical location and login history together, such as when the user logs in from where), and/or historical correlation (e.g., what the user has done during prior logons). For example, the system 100 can pull prior locations that the user has authenticated from and compare the prior location(s) against the current location. In some aspects, the current location can be pulled, at the time the pre-authentication procedure 105 is running, from the device attempting to authenticate itself to the service 100. The user conduct information can include other information related to devices accessing the system 100 and/or other information that can be gathered from current and/or prior authentications. Device-related information can include a device type, an operating system (OS) level, an indication of a patch release (e.g., for major releases), a browser type, a browser version, and/or the like. In addition, information relating to the date, time, time zone, and/or or the like of the pre-authentication can be inputted and recorded. The information related to the user conduct evaluation 120 can be stored with the user-related information 195.

In some aspects, the system 100 can use information on applications/resources access attempts. For internal usage, the information can come from a central data store, such as a lightweight directory access protocol (LDAP) and/or active directory. In some aspects, internal usage can refer to business-to-enterprise (B2E) usage. The data stores can be used as a primary source for authentication various corporate resources, which can include web site logons, WiFi logons, desktop logons, network logons, application logons and/or the like. In some variations, time and device logon patterns or other information may be extracted from these logons and stored.

For correlation of authentication information outside of an enterprise, a different data store may be utilized for the history of logon information. In some aspects, external usage can refer to one or more of business to consumer (B2C) or business-to-business (B2B). The external usage information can be extracted from external "cloud-based" resources, such as large commercial identity providers (e.g., Google, Yahoo, Microsoft, LinkedIn, Twitter, government-based identity providers, and/or the like). In some variations, these identity resources can be used as repositories of authentication credential information and can be used by third-party apps for authentication. In obtaining the information from large authentication data stores, correlation patterns among authentications.

In addition to obtaining and/or storing what, where, when, and/or the like relating to requested access of IT resources, patterns relating to logons may be obtained and stored. Such patterns can include a number of failed authentications, password resets, and/or help desk assistance requests/fulfillments. In some aspects, this information can help correlate a user's logon pattern and/or identify personal credential attacks.

As illustrated, the pre-authentication procedure 105 can additionally or alternatively include behavioral biometrics evaluation 130. "Behavioral biometrics" can refer to the manner in which the user logs in. For example, these biometrics can include human-to-device input vectors such as a user's speed of typing; intervals between the user's character typing (e.g., time between typing different portions of text); the firmness with which the user presses a keypad or other user interface; the location in and/or the force with which the user presses to provide input to a keyboard, screen, or other user interface; and/or other input vectors. In some aspects, the behavioral biometrics related to a user and/or device can be captured during a logon event. The behavioral biometrics can also evaluated during continuous authentication 160 (e.g., during evaluate behavioral biometrics 164).

In some variations, the behavioral biometrics information can be stored in the user-related information 195, and may be correlated per user and per device. This information can help the system detect anomalies in logon behavior and/or help identify users who are utilizing another user's credentials. In some variations, this information can be used for devices (e.g., mobile devices, desktops, terminals, and/or the like) that allow the information to be gathered and sent the system 100. The collection of this information can be in the form of JavaScript for web and/or cloud apps, and may be through a software development kit (SDK) for mobile and/or legacy desktop applications. Such behavioral biometrics can also be utilized for conducting continuous authentication 160 through another evaluation of behavioral biometrics 164.

As illustrated, the pre-authentication procedure 105 can additionally or alternatively include internet protocol (IP) reputations evaluation 140. An IP reputation can refer to an indication that an IP address has been associate with negative actions. Such negative actions can include sending out malware, scanning external systems, sending out phishing emails, sending out or being involved in distributed denial of service (DDOS) attacks, and/or the like.

In some aspects, the system 100 can receive IP reputation information from an external source. For example, the system 100 can pull historical IP reputation information on a device from the internet. In some variations, the system 100 or an external component can keep a real time list of "bad actors," which is a list of IP addresses and/or groups of IP addresses which are behaving poorly in the internet. These lists can be correlated by the system 100, or the external component that pulls the list, in real time from multiple internet service providers (ISP). The lists and/or the information contained therein relating to specific IPs can be dynamically input from various resources. These correlation services (e.g., external components) can be referred to as "IP reputation services." In some aspects, an IP reputation service can be local to the system 100 (e.g., stored as user-related information 195).

In a real-time scenario, when a user is ready to authenticate, the system 100 can consume the user's IP information and pass it to one or more of the IP reputation services. The IP reputation service can then return a binary score or scaled score of the IP address' reputation. If the address has been known to conduct attacks and/or other negative internet activities, the IP reputation can reflect this in the score. In turn, the system 100 can use this score as information to aid the system's 100 determination of whether a requested use should be allowed to continue in the pre-authentication procedure and/or how much a user ID confidence score should be affected. In some aspects, an IP reputation may be more relevant for external authentication (e.g., B2C and/or C2C authentication).

Once the pre-authentication procedure 105 is complete, the system 100 may perform an ID confidence score evaluation 150. As noted above, the ID confidence score may be determined through the pre-authentication procedure 105, and/or may indicate the system's 100 trust that the user is who they purport to be. In some variations, each of the evaluations 110-140 in the pre-authentication procedure can generate a value related to the evaluation that forms a part of the ID confidence score. For example, the device registration evaluation 110 can determine that a user is accessing the system 100 with a known device, and generate a score of "35" out of a possible value of "35". Similarly, the user conduct evaluation 120 may determine, among other things, that the user is attempting to access the system 100 from a GPS location that the user has previously never used at a time when the user has never requested to access the system 100, and may generate a score of "10" out of a possible value of "50". In some variations, the ID confidence score is determined via a real time engine that collects the results of the biometric and conduct models. The ID confidence score can reflect low ratings/scores from user behavior and conduct.

Additionally, the behavioral biometrics evaluation 130 and/or behavioral biometrics evaluation 164 can determine that the user is typing much faster than usual and generate a score of "5" out of a possible value of "25". Finally, the IP reputation evaluation 140 may determine that the IP address being used by the user to access the system 100 does not have a history of being involved in any negative internet actions and generate a score of "30" out of a possible value of "30". Combining the generated scores from each evaluation, the pre-authentication procedure 105 may generate an ID confidence score of "80" out of a possible value of "140" or a value of approximately 57%. Although specific numerical examples are provided, these examples are not intended to be limiting. For example, in various variations, the maximum possible value may be different (e.g., out of "100"), the evaluations may be weighted differently relative to each other (e.g., may all be weighted equally), additional evaluations may factor in to the scoring, and/or not all of the described evaluations may occur. For example, the system 100 may utilize information obtained from mobile providers, governments, device manufacturers, credit reporting services, and/or the like.

In some variations, the ID confidence score may be calculated without the user even providing their identity (e.g., user ID). For example, the information correlated/obtained through the pre-authentication procedure 105 can be referenced against device information, user information, behavior information, and/or the like in the user-related information 195 to determine if any known user matches (or closely matches) the correlated information.

In some variations, the system 100 may request a user's identification, map the current collected information from the pre-authorization procedure 105 to the user's identification, and/or compare the current collected information against information stored in the user-related information 195 (and/or external sources) for the identified user. In some aspects, the comparison may only be limited to instances similar to the current instance. In various variations, the device and/or the system 100 may collate certain information relating to the current instance. In related aspects, the device can collate the information in a secure fashion (e.g., using a cryptographic hash) before it is sent to the system 100. The cryptographic hash may already be known/stored by the system 100 or can be sent by the device to the system 100. Other secure transmission procedures may be used.

If a match (or matches) is found in the user-related information 195, then a confidence score may be returned based on how much of a "match" the current pre-authorization information is to one or more prior instances in the user-related information 195.

Regardless of the method used for calculating the ID confidence score, the system 100 may select an authentication method to use for the user, based at least in part on the calculated ID confidence score. In some variations, if the ID confidence score is high enough, the system 100 can determine that no authentication procedures are necessary, as the system 100 is confident enough that the user requesting resources is known and/or trusted. In other variations, the system 100 may select one or more authentication procedures for the user to complete before providing IT resources to the user.

Based on the ID confidence score evaluation 150, the system 100 may conduct continuous authentication 160 of the user. During continuous authentication, a combination of user conduct evaluation 162 and behavioral biometrics evaluation 164 can be performed. Similar to the behavioral biometric evaluation 130 during pre-authentication, the evaluated behavioral biometrics 164 during continuous authentication 160 include the collection and processing of actual biometric behavior of a user. Such behavioral biometrics can include mouse movement, keyboard dynamics and/or screen touch detections. The biometric behaviors can be utilized to create and/or update individual identity models 166 for each user. In some variations, the ID confidence score can be adjusted based on comparison of evaluated behavioral biometrics with the behavioral biometric model.

The ID confidence score can also be augmented by information related to the user's conduct. During continuous authentication 160, a user conduct evaluation 162 collects and processes actions of the user. Conduct information can include various processes started on an IT resource, registry values accessed/modified, files opened/modified, and inbound/outbound network traffic. Individual conduct models can be created for each user during the initial usage phase 166. Conduct models created based on user conduct can include processes opened, programs utilized, child processes created, CPU consumption, memory utilized and other events around program execution. The conduct of the user can be consumed by the system 100 which occur through the IT resource(s). A machine learning model can be created for each individual user that identifies the user by the specific actions and commands. User conduct can include items such as processes started, child processes started, files accessed, files deleted/modified, registry added/modified/deleted, and network connections created utilized for both inbound and outbound traffic. These items can be utilized to create a model that can be used to identify the user during continuous authentication 160. If the conduct of the user is anomalous to the user conduct represented by the conduct model, then the user's ID confidence score can be adjusted by lowering of the score.

In some variations, a user conduct model includes mouse movements. Mouse movements can be vectorized. For example, a mouse movement can be vectorized into a 21-dimensional vector including: time for leftclick, time for rightclick, first time for double click, second time for double click, third time for double click, time for dragdrop, direction for dragdrop or movement, line binned for dragdrop or movement, line velocity for dragdrop or movement, curve binned for dragdrop or movement, curve velocity for dragdrop or movement, curve acceleration for dragdrop or movement, ratio of curve to line for dragdrop or movement, offset for dragdrop or movement, error for dragdrop or movement, variability for dragdrop or movement, curvature for dragdrop or movement, curvature rate for dragdrop or movement, curvature velocity for dragdrop or movement, curvature acceleration for dragdrop or movement, angular velocity for dragdrop or movement, circular dragdrops, and circular movements that vectorize to zero or NaN handled in logic or in code.

Another user conduct model can include keyboard dynamics. Keyboard dynamics include how an individual user utilizes the keyboard to interact with computer programs. Keyboard models can be created with keystroke durations and/or keystroke labels. Keyboard models can record and collate using a manner and rhythm in which an individual types characters. The keystroke rhythms of a user can be measured to develop a unique biometric template of the user's typing pattern for continuous authentication. Such measurements can include the time a key is pressed (e.g., dwell time) and/or the time between key up and the next key down (e.g., flight time). The recorded keystroke timing data is then processed through an algorithm, which determines a primary pattern for future comparison.

Created behavioral biometric and/or user conduct models 166 can be created using a Bayesian hierarchical regression or mixed effects regression for modeling duration times as functions of unigrams, diagrams, and trigrams. Such approach allows one to share statistical strength (e.g., learning about the distribution times for the user for the keystroke). For example, "t-h-e" informs learning about the distribution of duration times for the user about keystrokes "t-h-o", for user i about keystrokes "t-a-p", and for user j about keystrokes "t-h-e". The keyboard solution fits user profiles, which is defined as a Bayesian exponential model for each keypress duration. For each letter, a gamma distribution having fixed hyperparameters (e.g., $\alpha=1$, $\beta=0.08$) can be interpreted as a single psuedo-observation of predetermined duration (e.g., 0.08 seconds). The gamma distribution is a conjugate prior for the exponential distribution, so that the Bayesian posterior distributions for each key-letter (more specifically, for the parameter governing the presumed exponential distribution for each letter press) can be expressed in closed form. In particular, the posterior hyperparameters after n observations, each a duration xi, is given by:

$$(\alpha', \beta') = \left(\alpha + n, \beta + \sum_{i=1}^{n} x_i\right) \quad (1)$$

During training of the behavioral/conduct models, each letter's posterior can be updated in a streaming fashion as keypresses are observed. The posterior predictive distributions for new keypresses can also be expressed in closed form, as a lomax distribution:

$$p(x_{new} | \alpha', \beta') = \frac{\alpha'}{\beta'}\left[1 + \frac{x_{new}}{\alpha'}\right]^{-(\alpha'+1)} \quad (2)$$

Using Equation (2), likelihood ratios for each new keypress can be computed. To make a decision about whether the current stream of keypresses comes from the user or an intruder, a one-sided hypothesis test can be performed by applying:

$$H_0: \mu \geq 0 \text{ vs } H_a: \mu < 0 \quad (3)$$

for the mean log-likelihood over a decision-making window size (e.g., previous W rows). The decision-making window may contain far less than W English letters, due to the inclusion of function keys (Esc, Spacebar, etc.) or due the fact that each character must be represented twice, once for upstroke and once for downstroke.

Anomalous users can be determined by considering parent/child process pairs obtained through a device agent, assembled into a Markov model. A process conduct model can be created through the collection of user conduct data. The user conduct data can be constructed in a j sonstructured dictionary of process data, where for each process event (instance of running process). For example, a process conduct model can be created using a process event, $p_v^i$, where $\$v:=p_v^i$ ["Name"] and i refers to the $ith instance of the process event with name v.

First, each process can be matched with its parent via the Uid and ParentUId. The directed graph structure can be obtained by gluing these edges together in such a way that the set of nodes of the graph corresponds to the set of unique process names. For each process, each outgoing edge can be weighted by proportion, e.g., for a given parent child pair (v, w), count with multiplicity the number of parent child process pairs $(v, w)_i$ in the training corpus, and weigh the unique edge (v, w) as:

$$\frac{\text{Count}(\{(v, w)\}_i)}{\sum_{n(v)} \text{Count}(\{(v, u)_j\})}, \quad (3)$$

where n(v) is the set of neighbors of v. Node probabilities can be assigned by considering process event duration. Specifically, for each process event $p_v^i$, compute the value $$\Delta t_v^i := p_v^i[\text{"EndDateTime"}] - p_v^i[\text{"StartDateTime"}] \quad (4)$$

and sum over all process events with the same name. This yields a time delta vector corresponding to the set of unique process names. A probability distribution can be assigned to the nodes of the graph by normalizing this time delta vector. This yields:

$$P(v): = P(p_v) = \frac{\sum_i \Delta t_v^i}{\sum_{w,j} \Delta t_w^j}. \quad (5)$$

The process duration probability distribution can be weighted with the PageRank distribution in order to take node (process) connectivity into account when computing likelihoods of process paths. PageRank can be computed by replacing the graph described above by a strongly connected smoothing thereof.

Once a process model is created, the model can be trained. Path probability distributions can be built by first specifying a path length, then enumerating paths in the graph of that length. Given the process path v→w→u, P (v→w→u) can be computed by applying the Markov rule:

$$P(v \to w \to u) = P(v)P(v \to w)P(w \to u) \quad (6)$$

$$= \frac{\sum_i \Delta t_v^i}{\sum_{r,j} \Delta t_r^j} * \frac{\text{Count}(\{v, w\})}{\sum_{n(v)} \text{Count}(\{v, s\})} * \frac{\text{Count}(\{w, u\})}{\sum_{n(w)} \text{Count}(\{w, x\})}$$

A path $p_0$ can be scored by computing $P(p_0)$ via Equation (6) and comparing this result to $\{P(p)\}$ for all paths p in the graph G such that $len(p)=len(p_0)$. The comparison can be done by computing the percentile of $P(p_0)$ in $\{P(p)\}$. The path $p_0$ can be flagged as anomalous if $prctl(P(p_0))<\eta$, where $\eta$ is a threshold set or learned for the given user.

In some variations, once the authorization(s) is performed, the user ID confidence score may be increased. For example, if the maximum possible score is out of "100" and the user successfully completes a multi-factor authentication procedure, then the user's ID confidence score may be increased from wherever it was to a value of "100" or some other, higher value than obtained by the pre-authorization procedure 102. In various aspects, the ID confidence score is kept for the session to aid the system's 100 subsequent actions (e.g., analyzing the user session and/or requiring re-authentication, if necessary).

After the user's identity has been validated by the pre-authentication procedure 105 and/or continuous authentication procedure 160, the systems 100 logs the user on to one or more IT resource. A log on can be an assertion of identity in a context that the relying party (e.g., an IT resource) can digest. In some aspects, multiple methodologies may be implemented by the system 100 to assert the logon.

For example, for web and or solution as a service (SaaS) applications, the asserted identity can be in the context of a formatted web assertion (e.g., in the form of a SAML, WS-Fed, OpenID, OpenIDConnect, and/or the like). In some aspects, the logon can be in the format of an established exchange of logon data (e.g., an identity that follows the OAuth protocol). In some variations, a logon may be formulated as a communication to a device service, similar to a Windows credential collector for Windows desktop logons (e.g., Windows 7, 8, 10 or later) or a service to communicate to PAM logon (e.g., for Linux and/or compatible devices). Further, the logon can be an "intent," as utilized by mobile applications via a web browser. Additionally, network protocols such as RADIUS may be used to establish an identity in a system. In some aspects, custom coding supported by an agreed upon standard like representational state transfer (REST) application programming interfaces (API) may be used to pass the identity.

In accordance with various aspects, once the user is logged on, the system 100 can keep information relating to a state of the logon and/or the mechanism used for logon (e.g., as user-related information). This information can be utilized in the log-off procedures and/or the step-up authentication procedures described herein.

Once the authentication 160 and/or logon is successfully completed, the system may provide IT resources 170 to the user. For example, the system may provide the user with remote access to a desktop computer, software application(s), servers, and/or the like. As illustrated, the system 100 can include an agent 199 which may be configured to obtain information relating to the provided IT resources 170 and/or the user's utilization thereof. In some variations, the system 100 can generate and/or provide a token to each of the IT resources (e.g., on a per resource basis), which can include log-on and/or authentication information for the user. These tokens may be stored in the system 100 and/or at an agent 199 located at an IT resource. In some aspects, the tokens can be utilized for user session tracking, log-ons, and/or log-offs.

Based on the information obtained by the agent 199, the system 110 may perform user activity monitoring 180. For example, as part of the user activity monitoring 180, the system 100 can utilize the user-related information 105 to determine whether the user's behaviors and conducts are anomalous compared to the user's historical usage patterns.

These events (or at least a portion thereof) can be processed by a collection service. For some IT resources, the collection service can include the agent 199 running on the device (e.g., a process running on a device like a Windows desktop, Android mobile app, or the like). For some IT resources, the collection service can include a software development kit (SDK) which is integrated into the IT resource (e.g., a mobile app), and/or the collector of event information can be or include an off-device data collector, which may be an on premise data repository or cloud based data store.

In some implementations, the collection service (e.g., the agent 199) can take "snapshots" of at least a portion of the events. For example, a snapshot may be generated to include information relating to the names and number of files opened, the duration of how long each active application has been opened, current bandwidth usage, the number of ports open or the like. In some aspects, the snapshots are taken at intervals. Whichever manner in which the snapshot is collected, it (and/or the events) can be compared to previously recorded usage patterns of the user on that device. Additionally or alternatively, snapshot data can be compared against known actions and/or behaviors of malicious attackers, hackers, nefarious actors, and/or actors which may wish to do harm to the system 100, enterprise, users, etc. Additionally or alternatively, snapshot data can be compared against known actions and/or behaviors of other users of the same group and/or classification to determine whether the current examined user is acting anomalously with respect to standard and/or recognized behavior of users of the same group and/or class.

If the usage is determined to be anomalous, the user session can be modified/controlled by the system 100. For example, the system 100 can conduct a pro-active session, killing or suspending events, and/or force the user into a re-authenticate and/or locked-out state. In such a scenario, the user session on the device, app and/or network app may optionally be terminated and/or the user may be forced into a re-authentication state. Additionally or alternatively, at least a portion of the processes associated with the user logon are suspended and/or terminated.

In some variations, the system 100 may compare the snapshot according settings specified by an administrator of the system 100. In some aspects, the system 100 may only compare current snapshots against prior "normal" usage patterns. For example, the system 100 may flag and/or remove prior usages which are determined to be anomalous for the user (e.g., inconsistent with the user's usage of the IT resources 170).

In some variations, an external system/process which the user is accessing may be alerted that the logged-on user is acting suspiciously on the device. To this end, the system 100 may send a signal to the controlled IT resource to terminate the user's session. In various aspects, a log-off procedure can include one of the following mechanisms: (A) a federated standard XML packet (e.g., similar to a SAML Logoff), (B) a deletion of the user's proprietary session ticket (e.g., similar to a web cookie), (C) a direct API call to the controller resource (e.g., to a network device), and/or (D) a proprietary call from the system 100 to an agent on the resource. In some aspects, the proprietary call from the system 100 may be utilized from the agent 199 communicating with an IT resource agent. The agent at the IT resource may then instruct the resource to log the user off via an on-resource call. The call can be a programmatic use of APIs or other mechanism. For example, the agent at the resource can call a Windows credential provider by the agent 199 to impact a sign-off for a Windows desktop.

In various aspects, the user can be logged out of the IT resource and/or sent back to the system 100 logon screen. In some variations, the system 100 may quickly terminate and/or suspend associated processes utilized by the user. The system 100 may be able to do so with the aid of an agent residing at a resource. If the resource is an application, the agent may be created through the use of an SDK, and may take commands and directives from the system 100.

If the user's monitored activity is determined to be anomalous, the system 100 may perform ID confidence score modification 190 for the user. For example, the user's ID confidence score may be set to equal a value of "0". After the ID confidence score modification 190, the system may again perform ID confidence score evaluation 150 and/or select one or more authentication method. In some variations, information related to the user's activity determined to be anomalous can be stored and/or associated with the user, in the user-related information 195 for example.

In selecting an authentication method for re-authentication, the system 100 may decide to "step-up" the authentication protocol and/or lockout the user from the system 100. Stepping up the authentication protocol may mean requiring that the user provide more information to authenticate themselves compared to the prior authentication and/or provide information and/or perform one or more authentication actions that the system 100 deems to be more difficult for the user to possess if they are not truly the user they claim to be (e.g., a multi-factor authentication that requires the use of a device that is not presently used by the user to access the system 100). Similar to the prior authentication, the chosen step-up authentication can be derived from a variety of sources including cloud-based SMS, telephony, push notifications on premise conventional one-time-password tokens, additional challenge response questions, and/or the like. The selected authentication method can include any of the methods described herein. In some aspects, the lockout may be for a set duration of time or may be permanent.

In some aspects, a help desk option may be required for re-authentication. In this event, the system 100 can provide a one-time-passcode to a help desk administrator or other personnel. In some aspects, personnel that the user does not know may be selected intentionally. The user may then be forced to call the help desk (e.g., via a message from the system 100) and upon confirming the user's identity the help desk personnel can read the one-time-passcode to the user.

In various aspects, at least a portion of the system 100 can be delivered as a Logon, Analyze, Logoff (LAL) system (or a subset of the LAL system) for a myriad of possible IT solutions. These IT solutions can include one or more of hardware devices (e.g., desktops, computing devices running Microsoft Windows, Apple iOS, and/or Mac OS), application frameworks (e.g., Amazon Web services (AWS) Cognito), privilege identity systems (e.g., BeyondTrust Privileged Access Management Software), cloud-based identification providers (e.g., Azure Active Directory (AD), Google Apps), mobile device managers (e.g., VMWARE Airwatch), network access control products (e.g., Bradford), application single sign-on (SSO) on-premise solutions (e.g., A10 Networks Thunder Application Delivery Control (ADC), Riverbed, F5 Networks Access Policy Manager, Computer Associates (CA) SiteMinder), cloud SSO solutions (e.g., Okta, PingOne, Centrify, OneLogin), cloud access security broker (CASB) integration (e.g., Netskope), network vendors (e.g., Cisco, Juniper, Extreme Networks), and/or the like.

Figure 2:
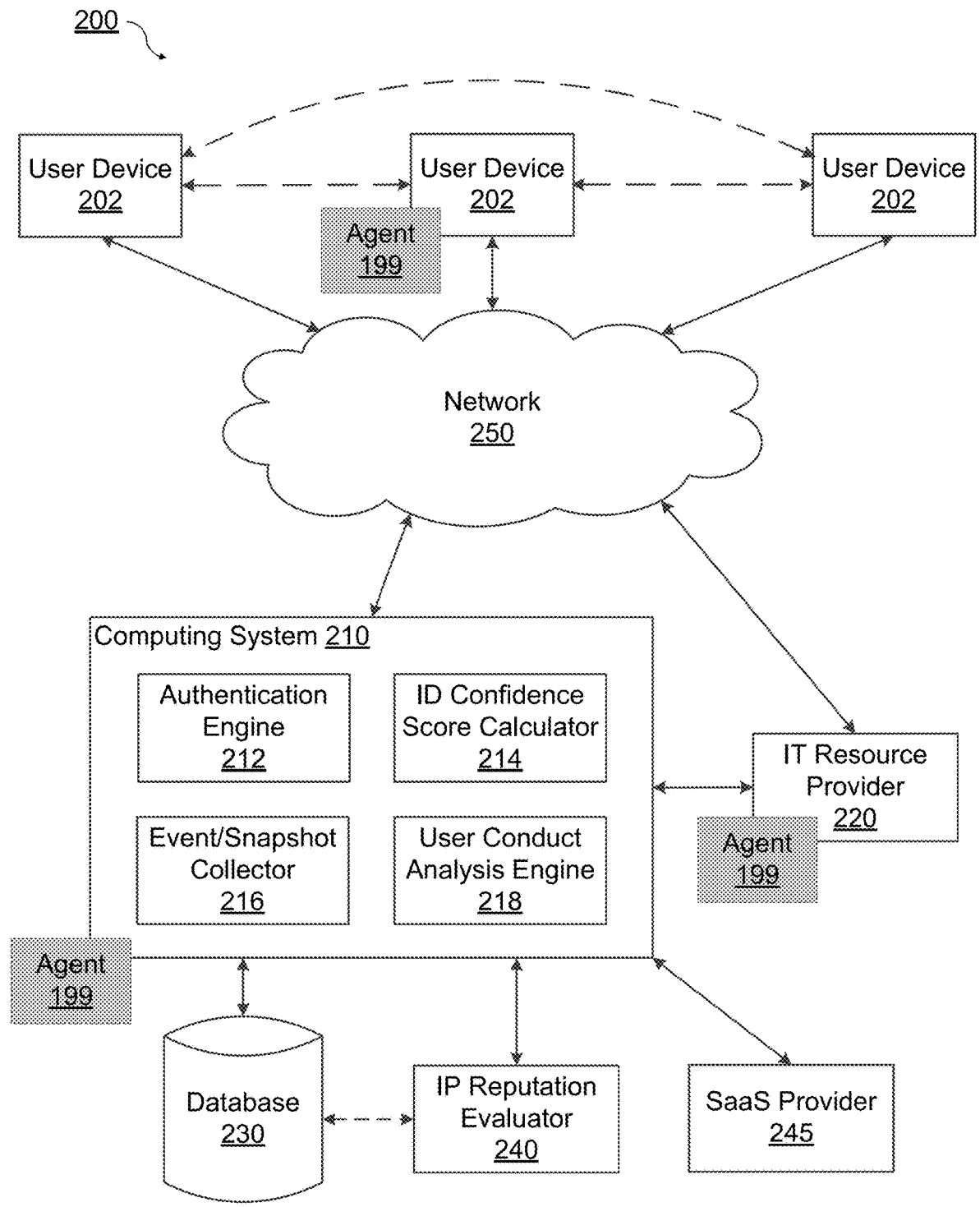
FIG. 2 illustrates an example system which may be utilized to implement one or more of the procedures described.
Figure 3:
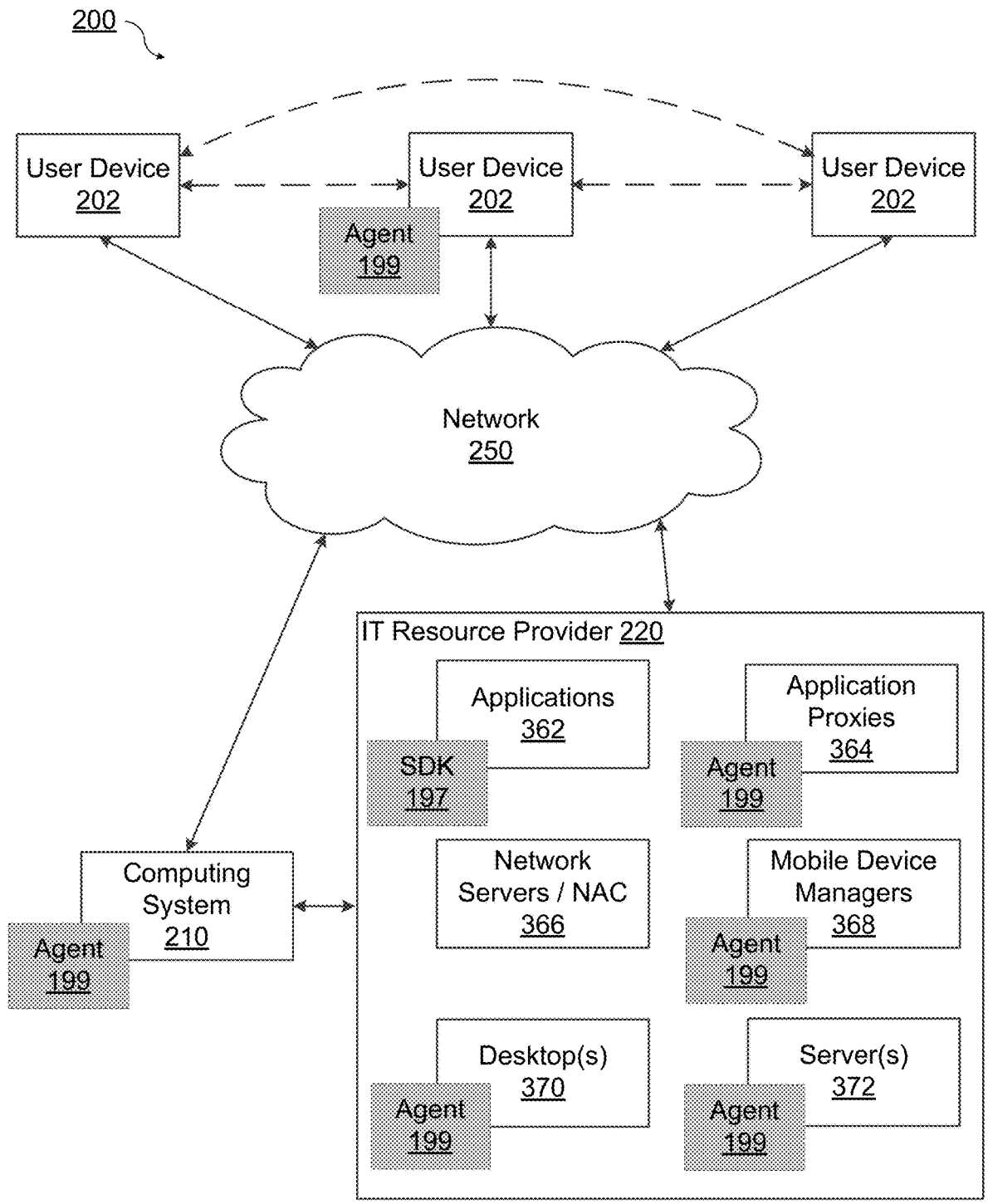
FIG. 3 illustrates additional components of the example system of FIG. 2.

FIG. 3 illustrates additional components of the example system of FIG. 2. For example, in various aspects, the system 100 of FIG. 1 may include one or more of the components of the system 200 (e.g., computing system 210, the IT resource provider 220, the database 230, and/or the IP reputation evaluator 240). Components of the system 200 can be on premise (e.g., at an enterprise) and/or can be off-premise (e.g., located in the cloud).

As illustrated, one or more user devices 202 may communicate with each other locally and/or may communicate with other devices over a network 250. Communication between user devices 202 can include Bluetooth (e.g., low energy) communications, Near-field communications (NFC), ZigBee communications, a universal serial bus (USB), wireless USB, device-to-device communications, and/or the like. In some aspects, a user device 202 may communicate over the network 250 with a computing system 210 and/or an IT resource provider 220. The user devices 202 may include one or more of a phone, mobile device, tablet, personal computer, or other device. In accordance with these aspects, the user device 202 may operate according to an iOS, Android, Mac, Windows, Linux, or other operating system. The network 250 can include one or more of a local area network (LAN), a wireless LAN (WLAN), a personal area network (PAN), a wide area network (WAN), a cellular network, the internet, and/or the like.

As illustrated, the computing system 210 may include one or more of an authentication service 212, and ID confidence score calculator 214, an event/snapshot collector 216, and/or a user conduct analysis engine 218. As also illustrated, the computing system 210 may include an agent 199, which can be configured to collect events and/or snapshots of user behavior. In some variations, the agent 199 can conduct logon assistance, logoff assistance, process termination, process suspension, and/or the like. In some aspects, the event/snapshot collector 216 can be an on resource and/or off-resource entity capable of keeping a history of the snapshots of user activities. In various aspects, the user conduct analysis engine 218 can be a cloud-based or on premise entity that compares a current snapshot (or set of snapshots) against a history of information related to the user. For example, as further illustrated, the computing system 210 may be in communication with a database 230, which may include information related to users, such as the user-related information 195 of FIG. 1. Specifically, the database 230 can include information on users, information on devices, and/or snapshot data relating to users on specific devices.

The authentication engine 212 can be a webserver and/or web service for authentication of users and/or devices. In some aspects, the authentication engine 212 can include a logon/logoff server which provides an interface for users to access IT resources, and can aid in the suspension and/or termination of a user's access to the IT resources. The authentication engine 212 and/or the logon/logoff server can be on premise or cloud-based. In some variations, the authentication engine 212 can be configured to select one or more authentication methods for a user and/or device, and may be configured to conduct the authentication methods (e.g., verify the user's password, generate or provide a one-time use token, verify a one-time use token, and/or the like). As described above, the authentication method can be selected based on an ID confidence score. The ID confidence score calculator 214 can be configured to generate and/or maintain an ID confidence score per user/device. The generation and maintenance of the ID confidence score can be according to the procedures described herein.

As illustrated, the computing system 210 may be in communication with an IP reputation evaluator 240. The IP reputation evaluator 240 can be configured to receive an IP address from the computing system 210 and provide information on the IP address back to the computing system, as described herein. As further illustrated, the computing system 210 may be in communication with a software as a service (SaaS) provider 245. In some aspects, the computing system 210 may utilize the SaaS provider 245 to provide an IT resource to a user device 202.

Although the computing system 210 is illustrated as including specific components, in various aspects, one or more of the components may not be present and/or additional components may be present. Similarly, although the IT resource provider 220, the database 230, the IP reputation evaluator 240, and/or the SaaS provider 245 are illustrated as separate from the computing system 210, in various aspects, one or more of these components may be part of the computing system 210. For example, in some aspects, the computing system 210 may include a server which also includes the database 230.

In some variations, the computing system 210 can provide highly scalable webservers and/or web services. In some aspects, the computing system 210 can provide a multi-tenant environment that allows logical differentiation of each tenant (e.g., customer). Each tenant may be able to choose their own authentication workflow, distinct data store, distinct user groups, distinct look-and-feel, and/or distinct targets.

In some aspects, the computing system 210 can be in direct communication with the IT resource provider 220, and in some aspects the computing system 210 can communicate with the IT resource provider 220 over the network 250. Additional details on the IT resource provider 220 are shown in FIG. 3. As illustrated in FIG. 3, the IT resource provider 220 can provide access to one or more of applications 262, application proxies 264, network servers/network access controllers (NAC) 366, mobile device managers 368, desktops 370, and/or servers 372. Although the IT resource provider is illustrated as including specific resources, in various aspects, one or more of the resources may not be present and/or additional resources may be present.

As further illustrated, one or more of the resources can include an agent 199, which may be used to control and/or monitor access to the resource. For example, as illustrated, an agent 199 may run on one or more of the application proxies 264, the mobile device managers 368, the desktops 370, or the servers 372. As further illustrated, an SDK 197 (similar to an agent 199) may be used to create one or more of the applications 362 so that a device (e.g., the computing system 210) can readily obtain information from and/or control the applications 362.

In certain variations, one or more of the user devices 202 can include an agent 199. The agent 199 running on the user device 202 may be used to obtain information from the user device 202 and/or control operation of the user device 202 while it is accessing the computer system 210. In some aspects, the agent 199 operating at a user device 202 can be controlled by the computing system 210 through remote function calls.

Figure 4:
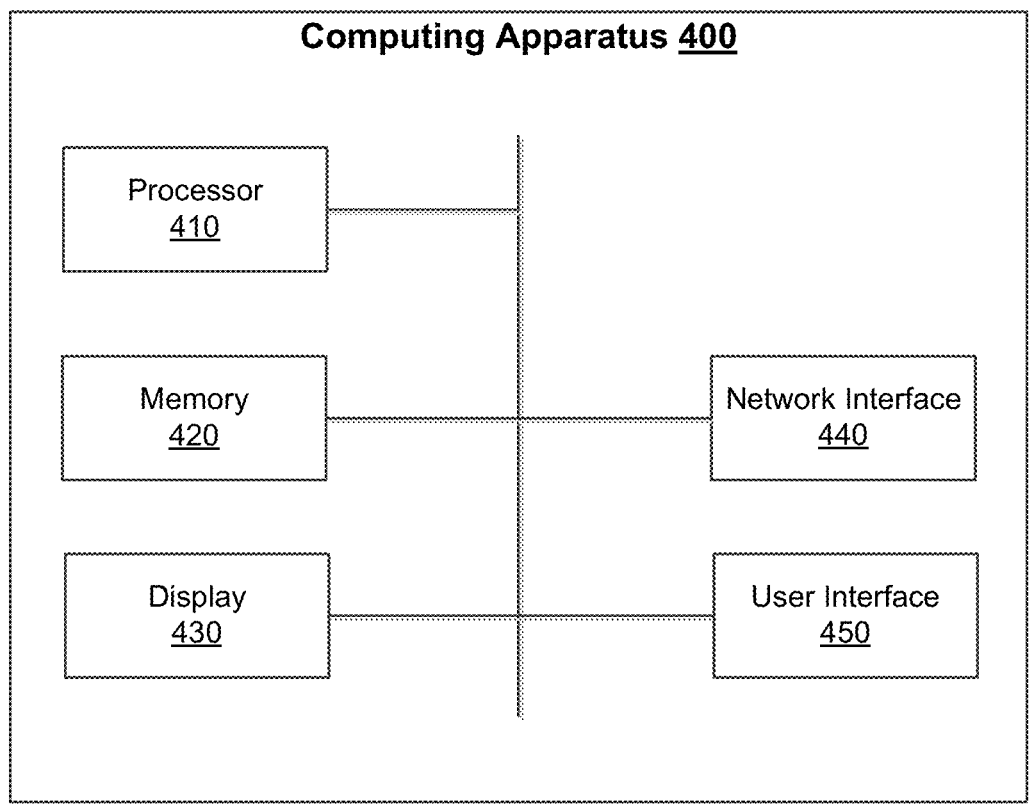
FIG. 4 is a diagram illustrating a sample computing device architecture for implementing various aspects described.

FIG. 4 is a diagram illustrating a sample computing device architecture 400 for implementing various aspects described. An apparatus consistent with at least a portion of the computing apparatus 400 may be used to implement one or more of the user devices 202, the computing system 210, the IT resource provider 220, the database 230, the IP reputation evaluator 240, the SaaS provider 245, and/or the agent 199. In some aspects, the computing apparatus 400 may be used to perform at least some of the processes described herein.

As illustrated, the computing apparatus 400 may include one or more processors such as processor 410 to execute instructions that may implement operations consistent with those described herein. The computing apparatus 400 may include memory 420 to store executable instructions and/or information. Memory 420 may include solid-state memory, solid-state disk drives, magnetic disk drives, or any other information storage device. Memory 420 may provide storage for at least a portion of a database. The computing apparatus 400 may include one or more displays, such as display 430. As illustrated, the computing apparatus 400 may also include a network interface 440 to a wired network or a wireless network, such as the network 250 of FIG. 2. Wireless networks may include WiFi, WiMax, and cellular networks (2G/3G/4G/5G), and/or any other wireless network. The computing apparatus 400 may include one or more user interface, such as user interface 450. The user interface 450 can include hardware or software interfaces, such as a keyboard, mouse, or other interface that may include a touchscreen integrated with a display 430.

Figure 5:
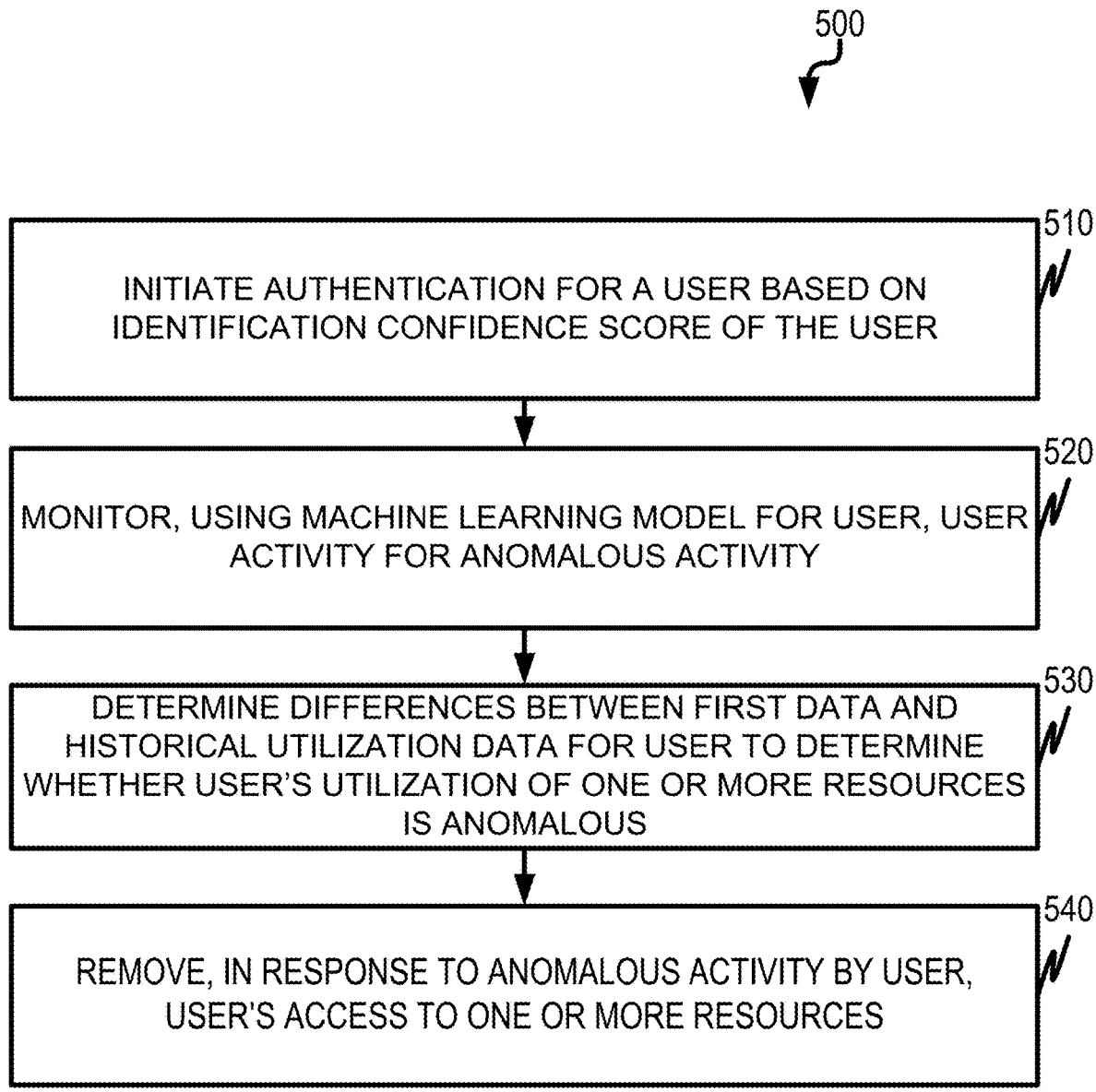
FIG. 5 illustrates an example process flow diagram for continuous authentication for one or more information technology resource.

FIG. 5 illustrates an example process flow diagram 500 for continuous authentication for one or more information technology resource. Authentication for a user is initiated, at 510, based on an identification confidence score of the user. The identification confidence score is based on one or more characteristics of the user. Using a machine learning model for the user, user activity of the user is monitored, at 520, for anomalous activity to generate first data. Differences between the first data and historical utilization data for the user are determined based on the monitoring, at 530, to determine whether the user's utilization of the one or more resources is anomalous. When the user's utilization of the one or more resource is anomalous, the user's access to the one or more resource is removed, at 540.

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital Mill image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed:

1. A system comprising:
   at least one data processor;
   memory storing instructions, which when executed by at least one data processor, result in operations comprising:
   determining an identification confidence score for a user as part of a pre-authentication procedure which includes a device registration evaluation in which a user device is recognized as being associated with the user, the identification confidence score indicating a level of trust that the user is who it purports to be;
   initiating authentication for the user based on the identification confidence score of the user being below a predefined level, the authentication comprising:
      continuously monitoring, using a trained machine learning model unique to the user, both of user conduct and behavioral biometrics associated with the user in connection with utilization of one or more resources by the user to generate first data;
      determining, based on the monitoring, differences between the first data and historical utilization data for the user to determine whether the user's utilization of the one or more resources is anomalous; and
      removing, when the user's utilization of the one or more resource is anomalous, the user's access to the one or more resources; and
   bypassing the authentication for the user based on the identification confidence score of the user being at or above the predefined level.

2. The system of claim 1, wherein the operations further comprise:
   suspending, in response to anomalous activity by the user, all processes associated with the user.

3. The system of claim 1, wherein the operations further comprise:
   terminating, in response to anomalous activity by the user, all processes associated with the user.

4. The system of claim 1, wherein the one or more characteristics of the user after the authentication includes at least one of a device in use by the user, a geographical location of the device, an authentication history of the user, a manner in which the user uses the device, and a reputation of the internet protocol address used by the device.

5. The system of claim 4, wherein the manner in which the user uses the device comprises one or more of the user's speed of typing, intervals between the user typing characters, a firmness of the user pressing a user interface, and a location of the user's input on the user interface.

6. The system of claim 1, wherein the operations further comprise:
monitoring the user's utilization of the one or more resources to generate snapshot data; and
comparing the snapshot data against historical utilization data for the user to determine whether the user's utilization of the one or more resources is anomalous.

7. The system of claim 1, wherein the operations further comprise:
monitoring the user's utilization of the one or more resources to generate snapshot data; and
comparing the snapshot data against known actions of an attacker to determine whether the user's utilization of the one or more resources is anomalous.

8. The system of claim 1, wherein the operations further comprise:
monitoring the user's utilization of the one or more resources to generate snapshot data; and
comparing the snapshot data against historical utilization data for a group of users similar to the user to determine whether the user's utilization of the one or more resources is anomalous.

9. The system of claim 1, wherein the operations further comprise:
modifying, after the removing, the identification confidence score based on the one or more characteristics of the user.

10. The system of claim 1, wherein the anomalous activity includes one or more observed user behavior that is not consistent with previously observed actions of the user.

11. The system of claim 1, wherein the operations further comprise:
providing, the one or more resources, an identity token for the user related to the authentication of the user, wherein the one or more resource comprises software applications, application proxies, network services, mobile device managers, desktop access, and server access.

12. The system of claim 11, wherein the removing the user's access to the one or more resources comprises informing the one or more resources of the anomalous activity based on the identity token.

13. The system of claim 1, wherein the authentication comprises requesting user biometrics.

14. The system of claim 1, wherein the behavioral biometrics are used to update the trained machine learning model.

15. A method comprising:
initiating logon of a user;
determining an identification confidence score for the user as part of a pre-authentication procedure which includes a user conduct evaluation in which circumstances surrounding the logon by the user are evaluated, the identification confidence score indicating a level of trust that the user is who it purports to be;
initiating authentication for the user based on the identification confidence score of the user being below a predefined level, the authentication comprising:
continuously monitoring, using a trained machine learning model unique to the user, both of user conduct and behavioral biometrics associated with the user in connection with the utilization of one or more resources by the user to generate first data;
determining, based on the monitoring, differences between the first data and historical utilization data for the user to determine whether the user's utilization of the one or more resources is anomalous; and
removing, when the user's utilization of the one or more resource is anomalous, the user's access to the one or more resources; and
bypassing the authentication for the user based on the identification confidence score of the user being at or above the predefined level.

16. The method of claim 15, further comprising:
suspending, in response to anomalous activity by the user, all processes associated with the user.

17. The method of claim 15, further comprising:
terminating, in response to anomalous activity by the user, all processes associated with the user.

18. The method of claim 15, wherein the one or more characteristics of the user after the authentication includes at least one of a device in use by the user, a geographical location of the device, an authentication history of the user, a manner in which the user uses the device, and a reputation of the internet protocol address used by the device.

19. The method of claim 18, wherein the manner in which the user uses the device comprises one or more of the user's speed of typing, intervals between the user typing characters, a firmness of the user pressing a user interface, and a location of the user's input on the user interface.

20. The method of claim 15, further comprising:
monitoring the user's utilization of the one or more resources to generate snapshot data; and
comparing the snapshot data against historical utilization data for the user to determine whether the user's utilization of the one or more resources is anomalous.

21. The method of claim 15, further comprising:
monitoring the user's utilization of the one or more resources to generate snapshot data; and
comparing the snapshot data against known actions of an attacker to determine whether the user's utilization of the one or more resources is anomalous.

22. The method of claim 15, further comprising:
monitoring the user's utilization of the one or more resources to generate snapshot data; and
comparing the snapshot data against historical utilization data for a group of users similar to the user to determine whether the user's utilization of the one or more resources is anomalous.

23. The method of claim 15, further comprising:
modifying, after the removing, the identification confidence score based on the one or more characteristics of the user.

24. The method of claim 15, wherein the anomalous activity includes one or more observed user behavior that is not consistent with previously observed actions of the user.

25. The method of claim 15, further comprising:
providing, the one or more resources, an identity token for the user related to the authentication of the user, wherein the one or more resources comprises software applications, application proxies, network services, mobile device managers, desktop access, and server access.

26. The method of claim 25, wherein the removing the user's access to the one or more resource comprises informing the one or more resources of the anomalous activity based on the identity token.

27. The method of claim 15, wherein the authentication comprises requesting user biometrics.

28. A method comprising:

initiating logon of a user;

determining an identification confidence score for the user as part of a pre-authentication procedure which includes (i) a user conduct evaluation in which circumstances surrounding the logon by the user are evaluated including two or more of web browser configuration, language, installed fonts, browser plug-ins, device IP address, screen resolution, browser cookie settings, geographical location, time zone, and geo-velocity and (ii) a device registration evaluation in which a user device is recognized as being associated with the user based either on a device identifier or a public key certificate, the identification confidence score indicating a level of trust that the user is who it purports to be;

initiating authentication for the user based on the identification confidence score of the user being below a predefined level;

continuously monitoring, using a trained machine learning model unique to the user, both of user conduct and behavioral biometrics associated with the user in connection with the utilization of one or more resources by the user to generate first data;

determining, based on the monitoring, differences between the first data and historical utilization data for the user to determine whether the user's utilization of the one or more resources is anomalous; and removing, when the user's utilization of the one or more resource is anomalous, the user's access to the one or more resource.

* * * * *